United States Patent [19]
Kahn

[11] 3,728,674
[45] Apr. 17, 1973

[54] BURGLAR AND PERSONAL PROTECTION ALARM SYSTEM FOR VEHICLES

[75] Inventor: Robert D. Kahn, Rockville Centre, N.Y.

[73] Assignee: Fedtro, Inc., Rockville Centre, N.Y.

[22] Filed: May 3, 1971

[21] Appl. No.: 139,508

[52] U.S. Cl. ............... 340/63, 307/10 AT, 200/42 R
[51] Int. Cl. .............................................. B60r 25/10
[58] Field of Search .......................... 340/63, 64, 65; 200/42 R; 307/10 AT

[56] References Cited

UNITED STATES PATENTS 3,197,734  7/1965  Kennell ................................ 340/65

Primary Examiner—Alvin H. Waring
Attorney—Amster & Rothstein

[57] ABSTRACT

An alarm system includes a signaling device and means for actuation thereof by any one of three methods: firstly, activation by means of removing a plunger switch, which, when removed, closes a normally open circuit; secondly, by means of a push switch which closes a circuit when depressed and opens a circuit when released, and thirdly, by means of an alarm switch. The system is intended for use in an automobile or the like wherein the plunger and push switches are located to be accessible to the driver of the automobile and the alarm switch is located, for instance, to be activated upon undesired opening of a door. Relay means are included in the circuits such that, particularly in the circuit associated with the alarm switch, the signaling device will continue to sound even after the door is closed.

6 Claims, 9 Drawing Figures

INVENTOR.
ROBERT D. KAHN
BY *Amster + Rothstein*
ATTORNEYS

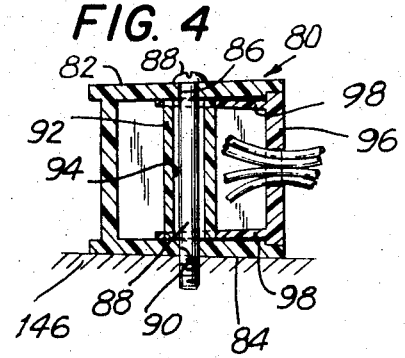
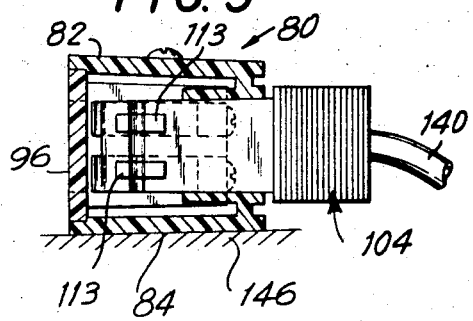
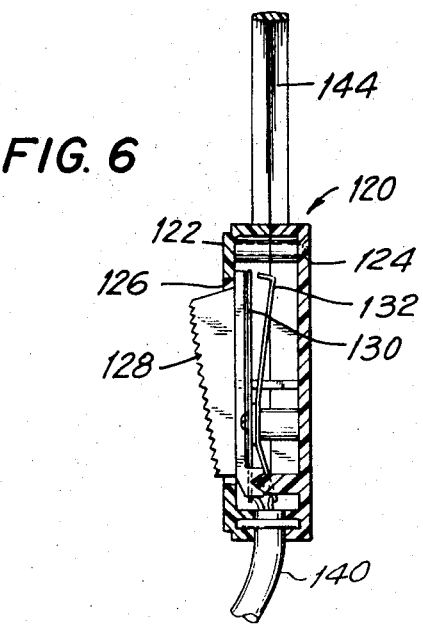
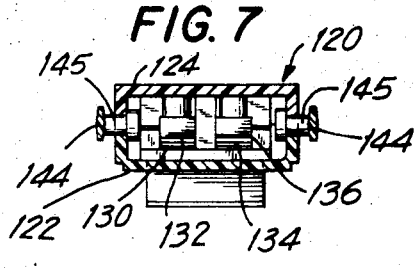
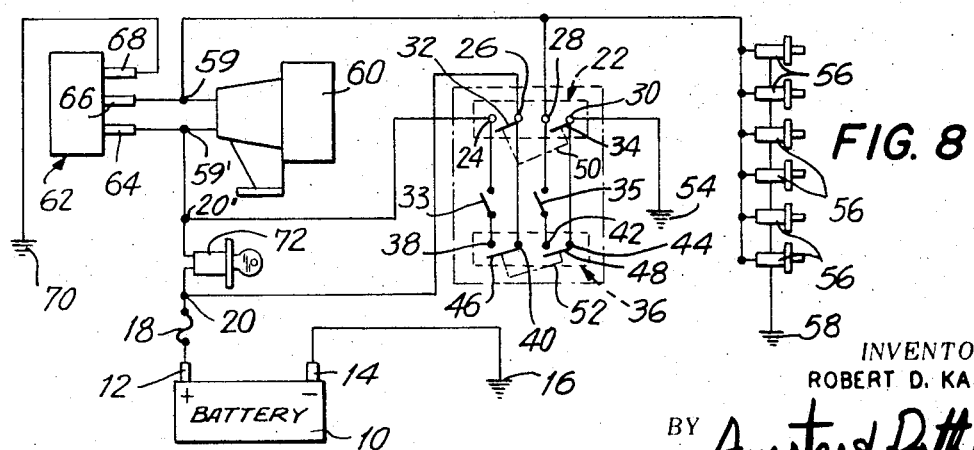

BURGLAR AND PERSONAL PROTECTION ALARM SYSTEM FOR VEHICLES

This invention relates primarily to alarm systems and more particularly to alarm systems useful in an automobile or the like for broadcasting a disturbance or a request for assistance.

With the advent of increasing crime rates in our present day society, and the desire for owners of property to protect themselves, it becomes increasingly important for such owners to be provided with means for requesting assistance in the event of a criminal occurrence. For instance, many automobiles today are provided with alarms which are activated upon disturbance of an automobile, such as by breaking the window or opening the door thereof. Such systems have been proven less than satisfactory for a number of reasons, among which is the inherent system construction which enables the potential thief to discontinue the alarm sequence by, for instance, closing the door which he has opened in his attempt to disturb the automobile. Such an action usually renders the system inoperative and, unless the alarm has been heard prior to the replacement of the door to its normal position, the alarm will go unanswered. Furthermore, alarm systems presently in use are expensive, include complicated structural components and have proven unreliable relative to the practical requisites of such systems.

Accordingly, a primary object of the present invention is to provide an alarm system which includes safeguards sufficient to meet the practical requisites for efficient and reliable operation.

A further and more particular object is to provide an alarm system that is relatively inexpensive and yet includes structural components necessary to thwart a potential crime.

These and other objects are provided in a construction according to the present invention which features a signaling device, circuit means for connecting the signaling device to various initiating switches for activation thereof and a lock switch for enabling the reliability of the system without the danger of unwanted triggering of the signaling device. The initiating switches include a plunger switch, a push switch and an alarm switch. The plunger switch comprises a switch housing including first and second, third and fourth contact members, spring loaded relative to each other in pairs such that the contact members are in a contacting relationship normally. The plunger device is structured for insertion between the contact members such that full insertion thereof breaks the contact between such contact members, but provides an alternate circuit for activation by the push switch. A second switch, the push switch, is used to activate the signaling device by means of a manually depressable switch, which closes a circuit through the plunger device and then through the contact members to the signaling device. In other words, as to both the plunger switch and the push switch, the circuit is formed from a source of power, such as a battery, (through the contact members when the plunger is removed) through the plunger device when the plunger is inserted, and through a push switch to the signaling device. When the plunger is removed, the plunger switch is closed by contact of the contact members and the signaling device is operative; when the plunger switch is inserted, and the push switch not depressed, the push switch is opened and the signaling device inoperative; and when the plunger switch is inserted and the push switch depressed, the signaling device is actuated. The system further includes a lock switch which is in series relationship between the battery and the signaling device such that if it is in an open position the plunger and push switches may be used but not the alarm switch.

The circuit further includes a relay sub-circuit which insures the continuation of the sounding of the signaling device after initiation using any one of the push switches, the plunger switch or the alarm switch. Discontinuance of the push switch and the plunger switch activated signaling due to the relay system, may be obtained by either releasing the push switch or replacing the plunger, respectively. As to the alarm switch, the relay system and the signaling are inactivated by placing the lock switch in an open position.

Further features of the device include the provision of a structural push switch hanger member for conveniently placing the push switch within the driver's reach. Furthermore, sleeve members are provided for assembling the housing for the plunger switch such that screws are placed through the first wall of the housing, then through the sleeve member and then through another wall of the housing to insure alignment of the screw holes defined by the respective walls of the housing.

The above brief description, as well as further objects, features and advantages of the present invention, will be more fully appreciated by reference to the following detailed description of the preferred, but nonetheless illustrative embodiment when taken in conjunction with the accompanying drawings, wherein:

FIG. 4 is a side sectional view of the plunger housing and mechanism taken along the line 4—4 of FIG. 2;

FIG. 5 is a side sectional view of the plunger housing and mechanism taken along the line 5—5 of FIG. 1;

FIG. 6 is a side sectional view of the push switch housing and mechanism taken along the line 6—6 of FIG. 1;

FIG. 7 is a top, sectional view of the push switch housing and mechanism taken along the line 7—7 of FIG. 1;

FIG. 8 is a schematic representation of the alarm system circuit means.

Figure 1:
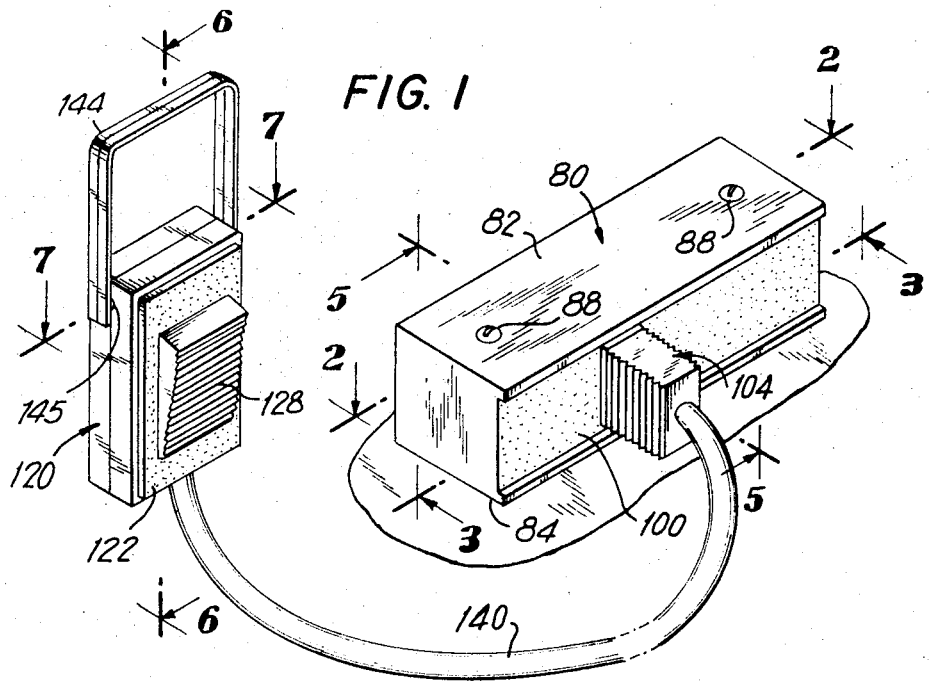
FIG. 1 is a front perspective view of a part of the alarm system including the push switch, its hanger member and the plunger switch as well as the electrical connection therebetween.

Referring to the drawings, and in particular to FIG. 8 thereof, the alarm system circuit means is shown as including a battery 10 having "+" and "−" terminals 12, 14, with the negative terminal 14 shown, for the purpose of illustration, as leading to ground 16. The positive terminal of battery 10 is wired through fuse 18 to a junction point 20. From junction point 20, the circuit, in one of its circuit paths leads to a key station generally designated 22. Key station 22 includes 4 terminal posts 24, 26, 28, 30, connectable in respective pairs (24 to 26, 28 to 30), by switches 32, 34. The key station 22 is actually the plunger switch of the present invention.

The circuit then is connected to a push switch generally designated 36 which includes terminals 38, 40, 42 and 44, connectable in respective pairs (38 to 40 and 42 to 44) by switches 46, 48.

As to the foregoing plunger switch and push switch descriptions, the circuit drawings of FIG. 8 includes broken lines 50, 52 to illustrate that the plunger switch and the push switch, respectively, have interconnected and simultaneously operating switches 32 and 34 in one set and 46 and 48 in the other set.

Terminals 44 and 30 lead in series to ground 54 in order to provide the circuit with a first path for completion. Terminals 42 and 28 lead in series along a second path to completion through alarm switches 56 to ground 58. The alarm switches 56 may be placed conveniently at locations throughout the automobile or the like being protected. For instance, one switch could be placed by means well known in the art on a door jamb, another switch 56 could be placed to protect against broken windows, another switch 56 could be placed on the hood lock, another switch could be placed at the trunk opening, etc.

Terminals 40 and 26 are connected with the lead-in from junction point 20 and terminal posts 38 and 24 are connected in series to junction point 20'. Terminal posts 42 and 28, which lead in series to the alarm switches 56, as previously discussed, also connect in series to one terminal 59 of the signaling device 60. The other terminal 59' of signaling device 60 is connected to junction point 20'.

Terminals 59, 59' of signaling device 60 are connected to the relay unit generally designated 62 which includes relays 64, 66 and 68. Relays 64 and 66 connect with the signaling device 60 and relay 68 leads to ground 70.

Between junction point 20, 20', in the circuit, a lock switch 72 of the type which is actuated from an open to a closed position by means of a key and standard tumbler mechanism, is used to enable the path of the circuit from the alarm switches 56. Thus, when the automobile operator leaves his car he would turn the lock switch to its "on" position to enable a circuit path from the positive terminal 12 of the battery 10 through fuse 18, through key lock 72 to terminal 59' of the signaling device 60. From the signaling device the circuit is completed through terminal 59 of the signaling device 60 and then to alarm switches 56 and then to ground 58. Current flow through the alarm switches 56 is, of course, determined by whether or not a door, window, hood, etc., has been tampered with by a thief. At the same time such a circuit is completed by pre-setting lock switch 72 and such tampering, a relay switch is activated to establish a circuit from the positive terminal 12 of battery 10 through terminal 59' of signaling device 60, through relay 64, through relay 66, through the alarm switches 56 to ground 58. Accordingly, after activation of an alarm switch by a thief, the signaling device 60 will continue to sound even though, for instance, a door is reclosed by a thief. If the door is reclosed by the thief, the following relay circuit is still active:

terminal 12 of battery 10 through fuse 18, through lock switch 72, through terminal 59' of signaling device 60, through relay 66, through relay 68 to ground 70. While such a circuit is active, current continues to flow through the relay as follows to keep the relay in an activated state: terminal 59', relay 64, relay 68, ground 70. In other words, the only way to stop the signaling device after activation by one of the switches 56, is to turn lock switch 72 to its "off" position.

The circuit also operates by closing push switches 46, 48, thus establishing the following circuit; terminal 12 of battery 10 through fuse 18, through terminal 26, through switch 46, through terminal 24, through junction point 20', through the signaling device to terminal 28, through switch 48, through terminal 30 to ground 54. Simultaneously, the relay is activated, since another circuit is simultaneously formed through terminal 59', through relay 64, through relay 66, through terminal 59. Therefore, current is flowing through the signaling device 60 as follows: from the positive terminal 12 of battery 10 through junction point 20, through terminal 26, through switch 46, through terminal 24, through junction point 20' through signaling device 60 through relay 66, through relay 68, to ground 70. When the push switch is released, the current of the relay is cut off by switches 46, 48 and the signaling device stops sounding. The only exception to this is when lock switch 72 is "on" when push switch 36 is activated. In such a circumstance, release of push switch 36 will not stop the signaling device. Only shutting off the lock switch 72 will accomplish an end to the signaling; however, it is not likely that the lock switch 72 will be in its "on" position with the lawful operator inside the automobile. It is the expectation of the inventor herein that lock switch 72 will be located so as to be accessible from outside of the automobile, after the automobile has been normally secured by the lawful operator.

The plunger switch 22 operates, from a circuit point of view, similarly to the operation of the push switch; however, circuit flow does not take place below the plunger switch 22 on the circuit diagram. In other words, there is no circuit flow through push switch 36. Circuit completion is accomplished by means of normally open switches 32, 34 and the cutoff is accomplished by disconnection of contact switches 33, 35, whose mode of operation and structure will be discussed in the following structural and operational description.

Referring to FIGS. 1 through 5, a switch housing, generally designated 80 is shown as including top and bottom walls 82, 84, the top wall 82 defining through-holes or openings 86 to facilitate insertion of through-bolts 88. The bottom wall 84 likewise defines through-holes or openings 90, for insertion of through-bolts 88. In normal practice, the extension of bolts from one wall to the other, both walls defining through-holes, presents a problem of insertion, since after projecting the bolt 88 through the top wall 82, it is difficult to align the bolt such that it is guided through hole 90 in the bottom wall 84. According to the present invention, sleeves 92 are provided to extend between the top wall 82 and the bottom wall 84 to define a passage for bolt 88 during its insertion through the housing. The sleeves 92 are shown as being generally cylindrical or annular in shape to define a central opening 94 therethrough. Switch housing 80 further includes back wall 96 (FIG.

4) which has extended therefrom a set of flanges 98 for bracing sleeve 92 in a desired position for guiding bolts 88 through the housing. As shown most clearly in FIG. 3, such flanges are four in number such that each sleeve 92 is supported in position by two such flanges 98.

The switch housing 80 is also shown to include front wall 100 which defines therethrough plunger opening 102. Such opening is for reception of plunger device 104. Electrical contact for plunger device 104 is provided by contact members 106, 108, 110, 112, corresponding to switches 32, 34 of the circuit representation of FIG. 8, previously described. Thus, the pair of contact members 106, 108 represent the switch 32 and the contact members 110, 112 represent the switch 34 in the circuit diagram.

Figure 2:
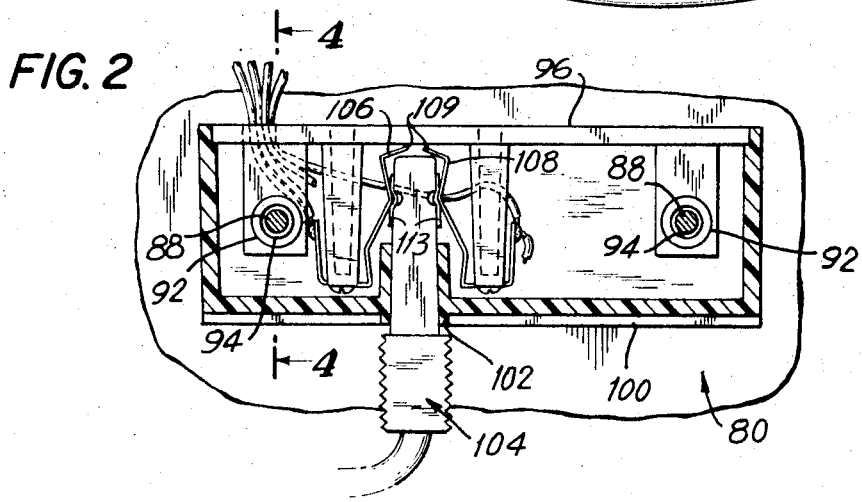
FIG. 2 is a top sectional view of the plunger switch and its housing taken along the line 2—2 of FIG. 1.
Figure 2A:
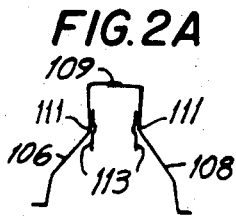
FIG. 2A is a partial view of the plunger switch of FIG. 2, particularly showing the contact members thereof.
Figure 3:
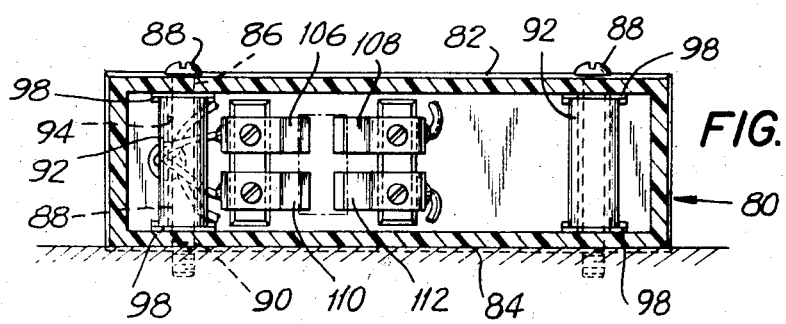
FIG. 3 is a front sectional view of the plunger housing taken along the line 3—3 of FIG. 1.

When the plunger 104 is inserted through opening 102, its function is to separate contact tips 109 of the contact members (shown clearly in FIGS. 2). Upon removal of the plunger 104 from opening 102 of housing 80, contact tips 109 are brought together by the spring-loaded character of the respective contact members. Furthermore, contact members 106, 108, 110, 112 are constructed such that while plunger 104 is inserted to hold contact tips 109 apart, contact points 111 are in electrical contact with plunger 104. To accomplish this purpose, as shown in FIGS. 2 and 5, the plunger 104 includes electrical contact members 113 which make electrical contact with contact members 106, 108, 110, 112 whenever the plunger 104 is inserted to switch housing 80. Electrical contact members 113 correspond to switches 33, 35 shown in the circuit representation of FIG. 8.

The structure of an alarm system according to the present invention further includes push switch housing, generally designated 120, as shown in FIGS. 1, 6 and 7. The push switch housing includes front and rear walls 122, 124, with the front wall defining therethrough a push switch opening 126. A push switch 128 is hingedly inserted through push switch opening 126 such that contact may be selectively accomplished between push switch contact members 130, 132, 134, 136 shown most clearly in FIGS. 6 and 7. Such contact members 130, 132, 134, 136 correspond to switches 46, 48 of the circuit representation of FIG. 8. Furthermore, wiring 140 between plunger 104 and push switch contact members 130, 132, 134, 136 is such that removal of plunger 104 from switch housing 80 accomplishes the complete electrical disconnection of the push switch housing 120 and its components. Also, it may be seen, particularly in FIGS. 1 and 6 that push switch housing 120 includes push switch hanger member 144 for convenience in mounting the push switch housing 120, so that it is accessible to the lawful operator of the automobile in which the alarm system is located. Hanger member 144 is attached to the push switch housing 120 by rotatable connection to shafts 145 extending laterally from push switch housing 120. On the other hand, the switch housing 80 for the plunger mechanism may also be mounted to be accessible to the lawful operator by extending bolts 88 through bottom wall 84 of switch housing 80 such that they extend into dash panel 146 or a like mounting surface.

According to the foregoing description an alarm system is described as including a plurality of actuation switches such as alarm switches 56, which may be of any construction well-known in the art, a push switch mechanism, a plunger switch mechanism for emergency "Mayday" use and enabling lock switch 72. The signaling device 60 may be of any known construction such as a siren or the like or any other sounding device such as a buzzer, a bell, a gong, etc., where laws restrict the use of sirens.

Furthermore, the signaling device 60 may be replaced by a telephone mechanism or the like for communicating a distress signal to the police or an alarm protection association or insurance company.

What is claimed is:

1. An alarm system for use with a source of power and a signalling device and for use in a vehicle comprising a signal initiation plunger mechanism, circuit means connecting said plunger mechanism to said signalling device, said plunger mechanism including a plunger switch movable between a first position and a second position, a push switch connected to said plunger mechanism, said plunger switch being operable in said first position to actuate said signalling device and supply a continuous alarm signal and said plunger switch being operable in said second position to circuit connect said push switch to said signalling device so that said push switch is operable to actuate said signalling device, and an alarm switch for actuating said signalling device to supply a continuous alarm signal.

2. The invention according to claim 1 wherein said alarm system includes a push switch housing for housing said push switch, said housing including a hanger member for facilitating mounting of said push switch in said vehicle in accessible reach to the operator of said vehicle.

3. The invention according to claim 1 wherein said alarm system further includes a switch housing for housing said plunger mechanism, said switch housing including first and second walls, each defining mounting openings therein, an annular sleeve extending between said openings, said sleeve defining an elongated opening connecting said wall openings for facilitating mounting of said plunger mechanism on said vehicle.

4. The invention according to claim 1 wherein said circuit means includes a relay sub-circuit and said alarm switch is operable to assume a normal position and an actuation position, said alarm switch for initiating signalling by said signalling device, said relay sub-circuit providing, after said alarm switch has been reset to a normal position, continuation of said signalling after initiation by said alarm switch.

5. The invention according to claim 4 wherein said alarm system further includes a lock switch operable by a key between an open and a closed position connected to said circuit means such that said continuation of said signaling is interrupted by opening said lock switch.

6. The invention according to claim 1 wherein said circuit means further includes a relay sub-circuit in parallel circuit relationship with said signaling device.

* * * * *